(12) United States Patent
Bampton

(10) Patent No.: US 8,445,115 B2
(45) Date of Patent: May 21, 2013

(54) BRAZED NANO-GRAINED ALUMINUM STRUCTURES

(75) Inventor: Clifford C. Bampton, Thousand Oaks, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 1362 days.

(21) Appl. No.: 12/018,341

(22) Filed: Jan. 23, 2008

(65) Prior Publication Data

US 2009/0186238 A1 Jul. 23, 2009

(51) Int. Cl.
*B32B 15/20* (2006.01)
*B23K 35/28* (2006.01)

(52) U.S. Cl.
USPC .............. 428/654; 228/218; 228/262.51

(58) Field of Classification Search
None
See application file for complete search history.

(56) References Cited

U.S. PATENT DOCUMENTS

| | | | | |
|---|---|---|---|---|
| 3,373,483 A | * | 3/1968 | Miller | 228/221 |
| 3,415,697 A | * | 12/1968 | Bredzs et al. | 228/234.3 |
| 3,477,118 A | * | 11/1969 | Terrill | 228/122.1 |
| 4,040,822 A | * | 8/1977 | Stern | 420/530 |
| 4,357,397 A | * | 11/1982 | Baba et al. | 428/654 |
| 4,818,481 A | | 4/1989 | Luton et al. | |
| 4,890,784 A | * | 1/1990 | Bampton | 228/194 |
| 5,512,081 A | | 4/1996 | DelGrosso et al. | |
| 5,669,436 A | * | 9/1997 | Papich et al. | 164/461 |
| 6,248,453 B1 | | 6/2001 | Watson | |
| 6,312,643 B1 | | 11/2001 | Upadhya et al. | |
| 6,605,556 B1 | | 8/2003 | Bose | |
| 6,848,163 B2 | | 2/2005 | Bampton et al. | |
| 6,902,699 B2 | | 6/2005 | Fritzemeier et al. | |

FOREIGN PATENT DOCUMENTS

| | | |
|---|---|---|
| EP | 1471157 | 10/2004 |
| EP | 1788102 | 5/2007 |

OTHER PUBLICATIONS

Archived Web Page http://en.wikipedia.org/wiki/Eutectic Oct. 23, 2006.*

* cited by examiner

*Primary Examiner* — John J Zimmerman
(74) *Attorney, Agent, or Firm* — Carlson, Gaskey & Olds

(57) ABSTRACT

A method of processing a brazed article includes forming a braze joint with an aluminum component comprising a nano-grained aluminum alloy.

21 Claims, 2 Drawing Sheets

BRAZED NANO-GRAINED ALUMINUM STRUCTURES

BACKGROUND OF THE INVENTION

This disclosure relates to brazed articles composed of nano-grained aluminum alloys.

Aluminum alloys generally exhibit a relatively wide range of mechanical characteristics and processabilities. For example, the mechanical characteristics and processabilities may depend on the alloy composition and prior processing history. Thus, although certain mechanical characteristics of an alloy may be desired for a particular use, the processability of the alloy may preclude forming the alloy into a desired shape having the advantages of the desired mechanical characteristic.

For example, certain aluminum alloys exhibit favorable processability that allows formation into heat exchanger components. However, other alloys having different processability have been precluded from use in articles such as heat exchangers.

SUMMARY OF THE INVENTION

The examples disclosed herein facilitate use of nano-grained aluminum alloys in brazed articles such as heat exchangers.

One example method of processing a brazed article includes forming a relatively strong braze joint with an aluminum component comprising a nano-grained aluminum alloy. For example, the braze joint may include a braze filler material having a composition that is compatible with the composition of the nano-grained aluminum alloy. Thus, the braze filler material forms a strong joint and allows the nano-grained aluminum alloy to be used in brazed articles such as heat exchangers.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
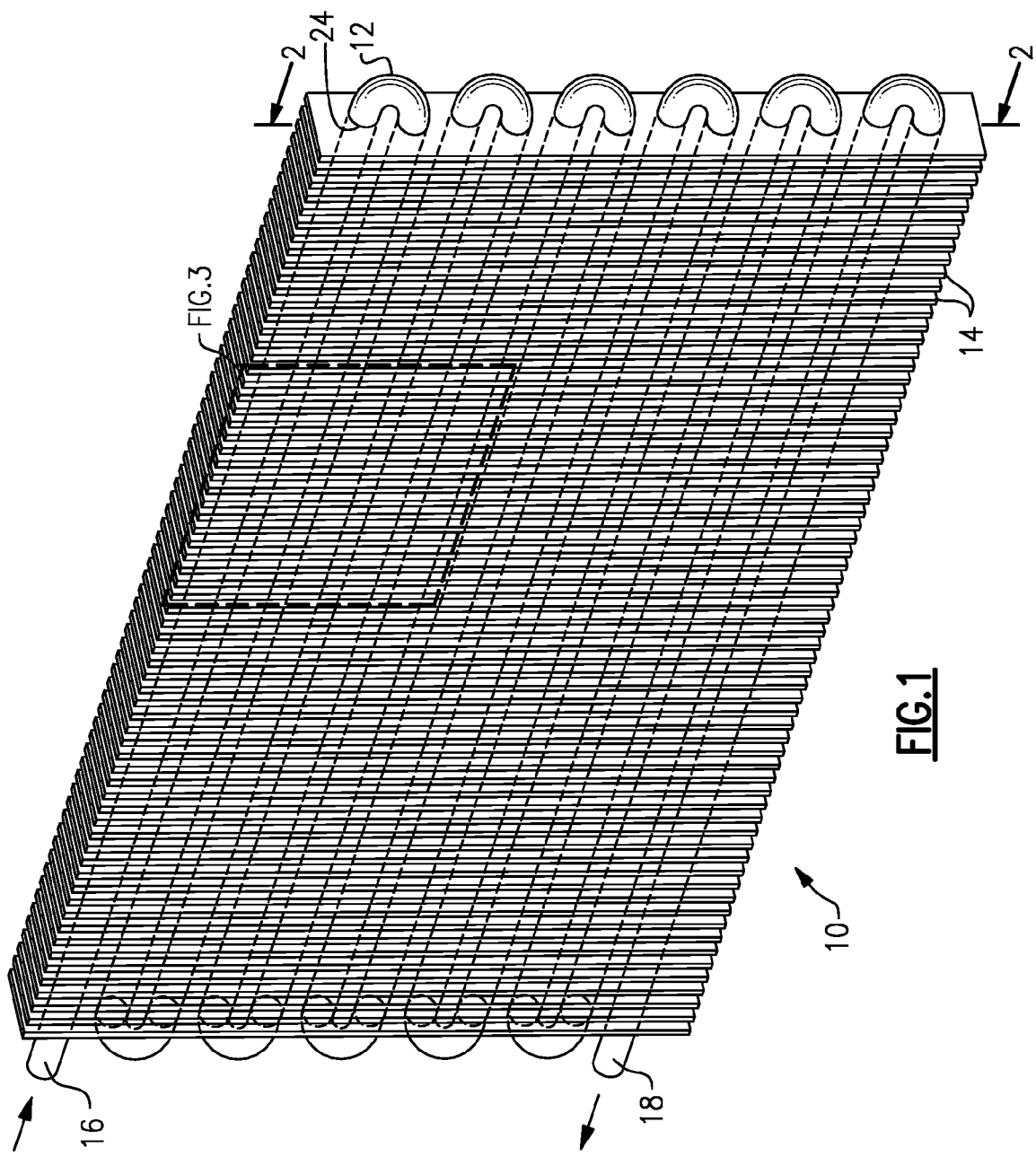
FIG. 1 illustrates an example brazed article.

FIG. 1 illustrates selected portions of an example brazed article 10. In this example, the brazed article 10 is a heat exchanger and includes tubes 12 and fins 14. The tubes 12 include an inlet 16 and an outlet 18 for circulating a fluid through the heat exchanger. The fins 14 are bonded with the tubes 12 and facilitate heat transfer between the tubes 12 and the surrounding environment. As can be appreciated, FIG. 1 is a somewhat schematic presentation for illustrative purposes only and is not a limitation on the examples disclosed herein. Additionally, there are various types of heat exchangers, many of which could benefit from the examples disclosed herein, which are not limited to the designs shown.

Figure 2:
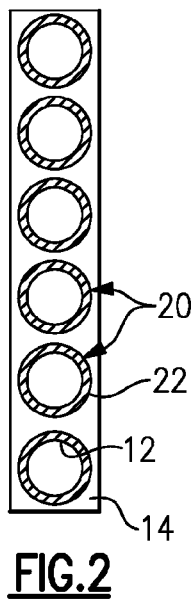
FIG. 2 illustrates a first cross-section of the brazed article.
Figure 3:
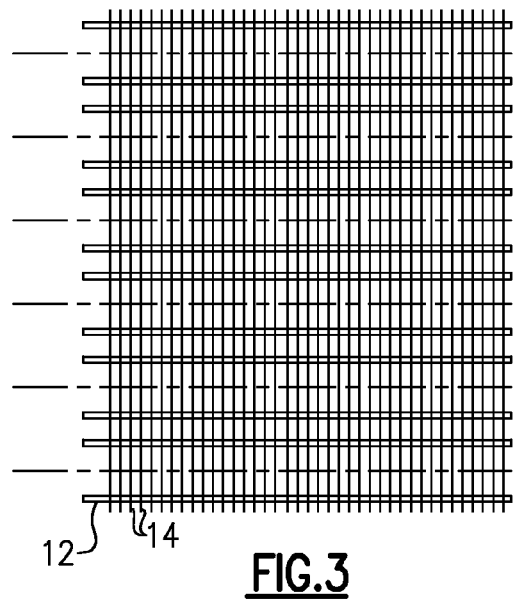
FIG. 3 illustrates a second cross-section of the brazed article.

Referring also to the sectional views shown in FIGS. 2 and 3 of the brazed article 10, the tubes 12 and fins 14 are joined at braze joints 20. The braze joints 20 form a relatively strong and corrosion resistant connection between the tubes 12 and the fins 14. The example brazed article 10 thereby provides the advantages of relatively high strength and high corrosion resistance compared to previous brazed aluminum articles. That is, the brazed article 10 is formed from a nano-grained aluminum alloy, which has superior strength and corrosion resistance properties compared to many conventional aluminum alloys having copper and zinc alloying elements. Thus, although prior conventional aluminum alloys may be formed into a brazed article, nano-grained aluminum alloys have not been formed into brazed articles, such as a heat exchanger. As will now be described, the brazed article 10 utilizes a braze filler material 22 within the braze joints 20 that is compatible with the nano-grained aluminum alloy and enables the nano-grained aluminum alloy to be used in the brazed article 10.

In the brazed article 10, the tubes 12, the fins 14, or both, may be formed from a nano-grained aluminum alloy. For example, the term "nano-grained aluminum alloy" used in this disclosure refers to a class of aluminum alloys that may be defined by composition, average grain size of the alloy, or the processing techniques used to form the alloy.

For example, the nano-grained aluminum alloy may include a composition having about Z wt %-12 wt % of magnesium where the variable Z is a non-zero amount, at least about 0.3 wt % of nitrogen, and a balance of aluminum. In a further example, the magnesium is present in an amount of about 4 wt %-4.9 wt %. In a further example, the magnesium is present in an amount of about 7.5 wt %. Additionally, the disclosed compositions may include only the given elements and possibly impurities that do not materially affect the properties of the nano-grained aluminum alloy or impurities that are unmeasured or undetectable. The term "about" as used in this description relative to compositions or other values refers to possible variation in the given value, such as normally accepted variations or tolerances in the art.

In addition to or in place of composition, the nano-grained aluminum alloy may be defined by grain size. For example, the nano-grained aluminum alloy may include an average grain size of about 0.5 micrometers (19.7 microinches) or less as measured through commonly known techniques, such as scanning electron microscopy. That is, the average grain size refers to the average diameter of the polycrystalline grains comprising the nano-grained aluminum alloy microstructure and does not refer to inclusions or intermetallic phases that may be present in some alloys. As can be appreciated, the average grain size of the nano-grained aluminum alloy may vary in size over the given range, but may be limited by the processing techniques used to create the grain size or the composition of the nano-grained aluminum alloy.

Additionally, or in place of composition or grain size, the nano-grained aluminum alloy may be defined by a processing technique used to form the nano-grained aluminum alloy. That is, the nano-grained aluminum may be formed using methods other than traditional heat treatment methods. For example, the nano-grained aluminum alloy is formed in a cryomilling process that includes milling particles of a stock aluminum alloy under cryogenic conditions in a nitrogen atmosphere, for example. Example cryomilling techniques are disclosed in U.S. Pat. No. 6,902,699, but need not be limited to the techniques disclosed therein.

The nano-grained aluminum alloy may be formed into the desired shape of the tubes 12 and fins 14 using known forming processes. For example, a powder comprising the nano-grained aluminum alloy may be pressed, extruded, forged, or otherwise formed into a desired shape under a suitable processing temperature and atmosphere. Once formed, the tubes 12 and fins 14 are then brazed together to form the brazed article 10, as will now be described.

Figure 4:
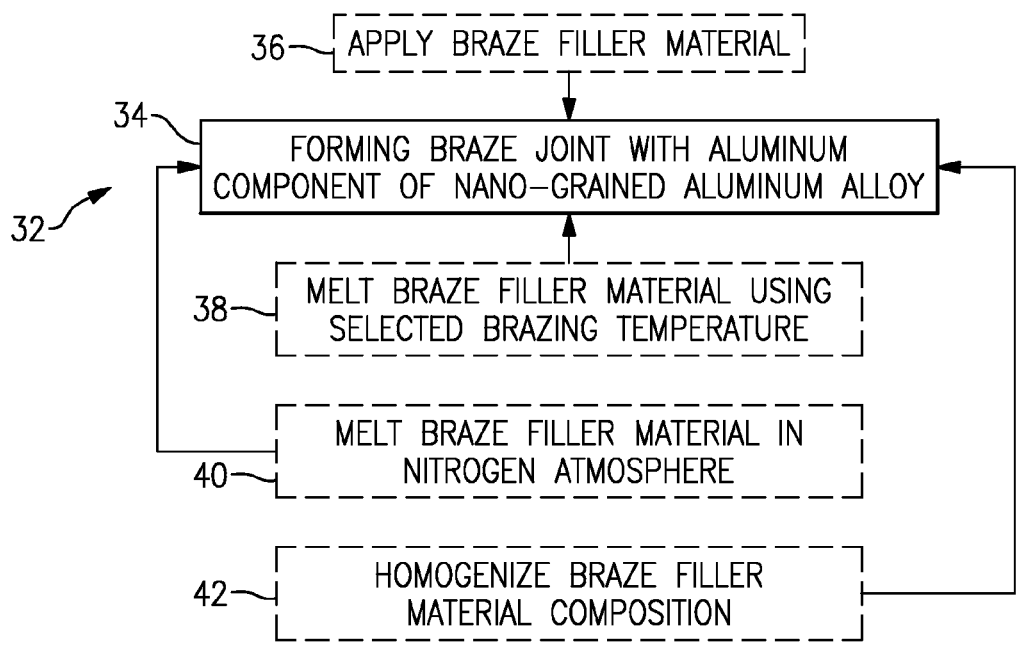
FIG. 4 illustrates an example method of forming a brazed article.

FIG. 4 illustrates an example method 32 including a formation step 34 of forming the braze joint 20 between the tubes 12 and fins 14, or between other components made of the nano-grained aluminum alloy. Various other steps as indicated by dashed line boxes may accompany the formation step 34; however, it is to be understood that the other steps may be optional and may be varied depending on a particular implementation. In this example, the braze filler material 22 is deposited between the tubes 12 and the fins 14 in an application step 36. For example, the braze filler material 22 is a powder that is deposited into a gap between the tubes 12 and the fins 14. That is, the fins 14 include openings 24 that the tubes extend through, with a clearance between the sides of the openings and the tubes 12.

The braze filler material 22 is compatible with the nano-grained aluminum alloy that is used for the tubes 12 and the fins 14. That is, when melted, the braze filler material 22 wets the surfaces of the unmelted tubes 12 and fins 14 to form the braze joints 20 with a desired degree of strength. If the braze filler material 22 were not compatible with the nano-grained aluminum alloy, wetting may not occur and a strong joint and corrosion resistance may not be formed.

The braze filler material 22 composition may include aluminum, magnesium, and optionally silicon. In an example that includes silicon, the braze filler material 22 includes about 10 wt %-40 wt % of magnesium, about X wt %-0.5 wt % of silicon where the variable X is a non-zero amount, and a balance of the aluminum. In a further example, the braze filler material 22 includes about 35 wt % of the magnesium, about 0.4 wt % of the silicon, and a balance of the aluminum.

The braze filler material 22 has a relatively low melting temperature compared to the nano-grained aluminum alloy of the tubes 12 and fins 14. For example, if a eutectic composition of the braze filler material is selected (i.e., about 35 wt % of the magnesium, about 0.4 wt % of the silicon, and the balance of the aluminum), the melting temperature is about 842° F. (450° C.). In contrast, the nano-grained aluminum alloy of the tubes 12 and fins 14 remains stable up to about 900° F. (482° C.) without significant grain growth. Thus, heating the tubes 12 and fins 14 to melt the braze material 22 in a brazing process does not effect the microstructure of the nano-grained aluminum alloy.

Once the braze filler material 22 is applied to the gap between the tubes 12 and fins 14, the tubes 12 and fins 14 are heated at a brazing temperature in a brazing step 38. The brazing step 38 may be conducted in a heating device, such as a furnace. In one example, the brazed article 10 is heated at a brazing temperature of about 830° F.-900° F. (443° C.-482° C.). In a further example, the brazed article 10 is heated at a brazing temperature of about 842° F. (450° C.), which corresponds to the eutectic melting temperature of the braze filler material 22. The given example brazing temperatures melt the braze filler material 22 to form the braze joints 20, but do not exceed the temperature stability limit of the nano-grained aluminum alloy. Thus, the nano-grained aluminum alloy retains its strength and other properties. Given this description, one of ordinary skill in the art will be able to determine a suitable brazing temperatures to meet their particular needs.

Upon melting, capillary forces cause the braze filler material 22 to fill the gaps between the tubes 12 and the fins 14. Upon cooling, the braze filler material 22 solidifies to form the braze joints 20.

Optionally, the method 32 may utilize a brazing step 40 that utilizes a nitrogen atmosphere within the heating device. For example, the nitrogen atmosphere includes greater than about 80 vol % of nitrogen and may include 99 vol % of nitrogen or more. The nitrogen atmosphere serves a dual function of reacting with aluminum of the nano-grained aluminum alloy to form surface aluminum nitrides and preventing surface oxide formation. In one example, the formation of the surface aluminum nitrides may promote wetting between the liquid braze filler material 22 during brazing and the nano-grained aluminum alloy. That is, the composition of the braze filler material 22 more effectively wets aluminum nitride than aluminum oxide. Thus, conducting the brazing of method 32 in the nitrogen atmosphere provides more uniform formation of the braze joint 20 than if the brazing step were to occur in an oxygen-containing atmosphere.

Optionally, the atmosphere of brazing step 40 may also include hydrogen to suppress oxygen activity, which further promotes the formation of the surface aluminum nitride rather than undesirable aluminum oxide. For example, the atmosphere may include about 10 vol % or less of hydrogen and a remainder of nitrogen, to suppress the oxygen activity. A greater amount of hydrogen may be used; however, increasing the amount of hydrogen may increase the combustibility of the atmosphere.

Optionally, a homogenizing step 42 may be used to transform the composition of the braze filler material 22 and thereby stabilize the braze joint 20. For example, the brazed article 10 may be heated at the braze temperature for a predetermined amount of time. Thus, the homogenizing step may occur in conjunction with brazing by simply holding the brazed article 10 at the brazing temperature for a longer period of time.

During the homogenizing step 42, the difference in composition between the braze filler material 22 and the nano-grained aluminum alloy drives diffusion of aluminum between the nano-grained aluminum alloy and the braze filler material 22. That is, within the given example compositions, the braze filler material 22 contains less aluminum than the nano-grained aluminum alloy. The difference in aluminum composition, causes diffusion of aluminum from the nano-grained aluminum alloy into the braze filler material 22 to thereby effectively decrease the relative amount of magnesium in the braze filler material 22. The diffusion thereby reduces the compositional difference between the braze filler material 22 and the nano-grained aluminum alloy, which facilitates reduction in diffusion during field use to make the braze joint 20 more stable.

The degree of homogenization of the braze filler material 22 may depend upon the temperature used and the duration of the treatment time. That is, higher temperatures and longer times result in a greater degree of homogenization and a final magnesium content in the braze filler material 22 that is close to the magnesium content of the nano-grained aluminum alloy. Similarly, lower temperatures and shorter periods of time may result in a lesser degree of homogenization and a corresponding greater difference between the magnesium contents of the braze filler material 22 and the nano-grained aluminum alloy.

The disclosed examples thereby facilitate the use of nano-grained aluminum alloys in brazed articles such as heat exchangers. Nano-grained aluminum provides a very high strength aluminum alloy, which does not require water quenching from a high solution treatment temperature, as do all conventional high strength aluminum alloys. Nano-grained aluminum derives its strength partly from nano-scale grains and partly from sub-nano-scale aluminum nitride particles, known as dispersoids. In addition to their strengthening utility, the dispersoids are not affected by heat treatment and prevent the grains from growing, providing the microstructural stability up to almost the alloy's melting temperature. This dispersion strengthening and microstructure stabilizing means that no heat treatment is necessary to strengthen nano-grained aluminum. This is very significant for complex brazed structures such as a heat exchanger. Water quenching such a complex structure will introduce enormous residual stresses, from uneven water cooling, which irreparably distorts the structure and may even disbond the braze joints. It is therefore difficult to utilize high strength, heat treatable aluminum alloys for brazed heat exchangers. Nano-grained aluminum heat exchangers can be designed as much lighter structures, important in many aerospace systems, since no water quenching is required.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can be determined by studying the following claims.

What is claimed is:

1. A method of processing a brazed article, comprising:
   using a braze filler material consisting essentially of about 10 wt %-40 wt % of magnesium, about X wt %-0.5 wt % of silicon where the variable X is a non-zero amount, and a balance of aluminum, forming a braze joint with a nano-grained aluminum alloy component consisting essentially of Z wt %-12 wt % of magnesium where the variable Z is a non-zero amount, at least about 0.3 wt % of nitrogen, and a balance of aluminum.

2. The method as recited in claim 1, wherein the braze filler material consists essentially of about 35 wt % of magnesium, about 0.4 wt % of silicon, and a balance of aluminum.

3. The method as recited in claim 1, wherein the nano-grained aluminum alloy component consists essentially of about 4 wt %-4.9 wt % of magnesium, at least about 0.3 wt % of nitrogen, and a balance of aluminum.

4. The method as recited in claim 1, wherein the nano-grained aluminum alloy component consists essentially of about 7.5 wt % of magnesium, at least about 0.3 wt % of nitrogen, and a balance of aluminum.

5. The method as recited in claim 1, further comprising homogenizing the braze filler material to diffuse aluminum from the nano-grained aluminum alloy component into the braze filler material to thereby decrease a relative amount of magnesium in the braze filler material.

6. The method as recited in claim 1, comprising forming the braze joint in a nitrogen atmosphere having greater than 80 vol % nitrogen.

7. The method as recited in claim 1, comprising heating a braze filler material at a temperature of about 842° F.

8. The method as recited in claim 1, comprising heating a braze filler material at a temperature of about 830-900° F.

9. The method as recited in claim 1, comprising cryomilling an aluminum alloy to form the nano-grained aluminum alloy component having an average grain size less than about 0.5 micrometers.

10. The method as recited in claim 1, wherein the braze filler material has a eutectic composition.

11. The method as recited in claim 1, including melting the braze filler material and wetting the nano-grained aluminum alloy component with the melted braze filler material.

12. The method as recited in claim 11, including brazing in a nitrogen environment of greater than about 80 vol % nitrogen and forming surface nitrides on the nano-grained aluminum alloy component to promote wetting between the melted braze filler and the nano-grained aluminum alloy component.

13. A brazed article comprising:
   a nano-grained aluminum alloy component consisting essentially of Z wt %-12 wt % of magnesium where the variable Z is a non-zero amount, at least about 0.3 wt % of nitrogen, and a balance of aluminum; and
   a braze alloy material joined with the nano-grained aluminum alloy component, the braze alloy material consisting essentially of about 10 wt %-40 wt % of magnesium, about X wt %-0.5 wt % of silicon where the variable X is a non-zero amount, and a balance of aluminum.

14. The brazed article as recited in claim 13, wherein the nano-grained aluminum alloy component consists essentially of about 4 wt %-4.9 wt % of magnesium, at least about 0.3 wt % of nitrogen, and a balance of aluminum.

15. The brazed article as recited in claim 13, wherein the nano-grained aluminum alloy component consists essentially of about 7.5 wt %-12 wt % of magnesium, at least about 0.3 wt % of nitrogen, and a balance of aluminum.

16. The brazed article as recited in claim 13, wherein the braze filler material has a first amount of magnesium and the nano-grained aluminum alloy component has a second amount of magnesium that is less than the first amount of magnesium.

17. The brazed article as recited in claim 13, wherein the nano-grained aluminum alloy component comprises an average grain size less than about 0.5 micrometers.

18. The brazed article as recited in claim 13, wherein the braze alloy material has a eutectic composition.

19. A brazed article comprising:
   a heat exchanger component including a nano-grained aluminum alloy consisting essentially of Z wt %-12 wt % of magnesium where the variable Z is a non-zero amount, at least about 0.3 wt % of nitrogen, and a balance of aluminum; and
   a braze alloy material joined with the nano-grained aluminum alloy of the heat exchanger component, the braze alloy material consisting essentially of about 10 wt %-40 wt % of magnesium, about X wt %-0.5 wt % of silicon where the variable X is a non-zero amount, and a balance of aluminum.

20. The brazed article as recited in claim 19, wherein the heat exchanger component comprises at least one of a heat exchanger tube or a heat exchanger fin.

21. The brazed article as recited in claim 19, wherein braze alloy material has a eutectic composition.

* * * * *